Feb. 11, 1936.　　　　E. E. BOWEN　　　　2,030,567
TRACTOR PLOW
Filed Aug. 6, 1934　　　　2 Sheets-Sheet 1

INVENTOR.
Edson E. Bowen
BY
Kwis, Hudson & Kent
ATTORNEYS

Feb. 11, 1936.　　　　　E. E. BOWEN　　　　　2,030,567
TRACTOR PLOW
Filed Aug. 6, 1934　　　2 Sheets-Sheet 2

INVENTOR.
EDSON E. BOWEN
BY
Kwis, Hudson & Kent
ATTORNEYS

Patented Feb. 11, 1936

2,030,567

UNITED STATES PATENT OFFICE 2,030,567

TRACTOR PLOW

Edson E. Bowen, Greenwich, Ohio, assignor to The Fate-Root-Heath Company, Plymouth, Ohio, a corporation of Ohio Application August 6, 1934, Serial No. 738,607

4 Claims. (Cl. 97—47)

This invention relates to improvements in tractor plows, although in its broader aspects it may be applicable to plows that are not connected directly or even indirectly with tractors. In some respects the invention may be considered as an improvement upon my copending application Serial No. 710,536, filed February 9, 1934, entitled "Plow hitch".

One of the objects of the present invention is the provision of a plow raising and lowering means and a plow counter-balancing means which are so designed and arranged as to substantially eliminate the counterbalancing effect while the plow is in the ground, at which time the weight of the plow is needed to maintain it at the proper depth in the ground, and in such manner as to increase the counterbalancing effect as the plow is raised, and to bring this effect to a maximum when the plow reaches its highest elevation, the raising connection reaching or passing dead center position when the plow is elevated, so that the strain upon the raising means is then reduced to a minimum.

Another object of the invention is the provision of novel safety means for permitting the plow to break away from the tractor and the plow frame in the event that some unusual obstacle is encountered.

Other objects and features of novelty will appear as I proceed with the description of that embodiment of the invention which for the purposes of the present application I have illustrated in the accompanying drawings, in which Fig. 1 is a side elevational view of a plow and plow frame embodying the invention.

Figure 2:
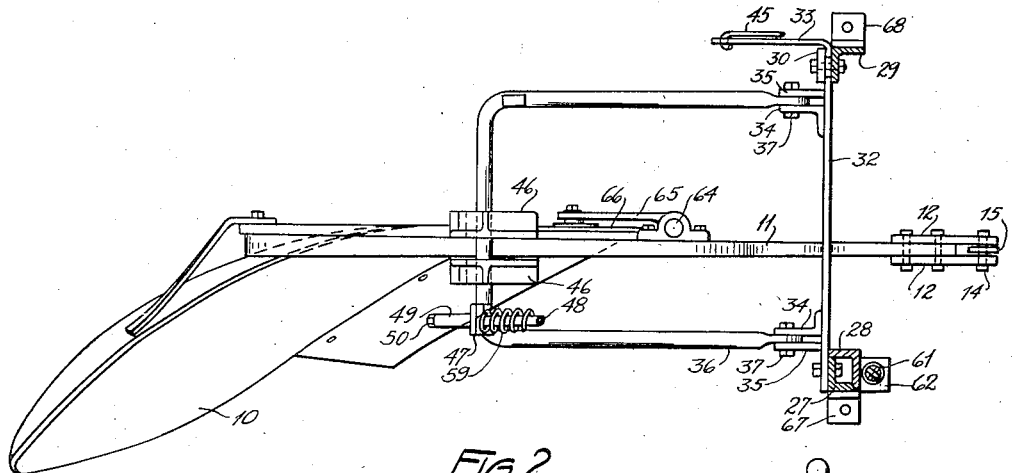
Fig. 2 is a horizontal sectional view taken substantially on the line 2—2 of Fig. 1.
Figure 1:
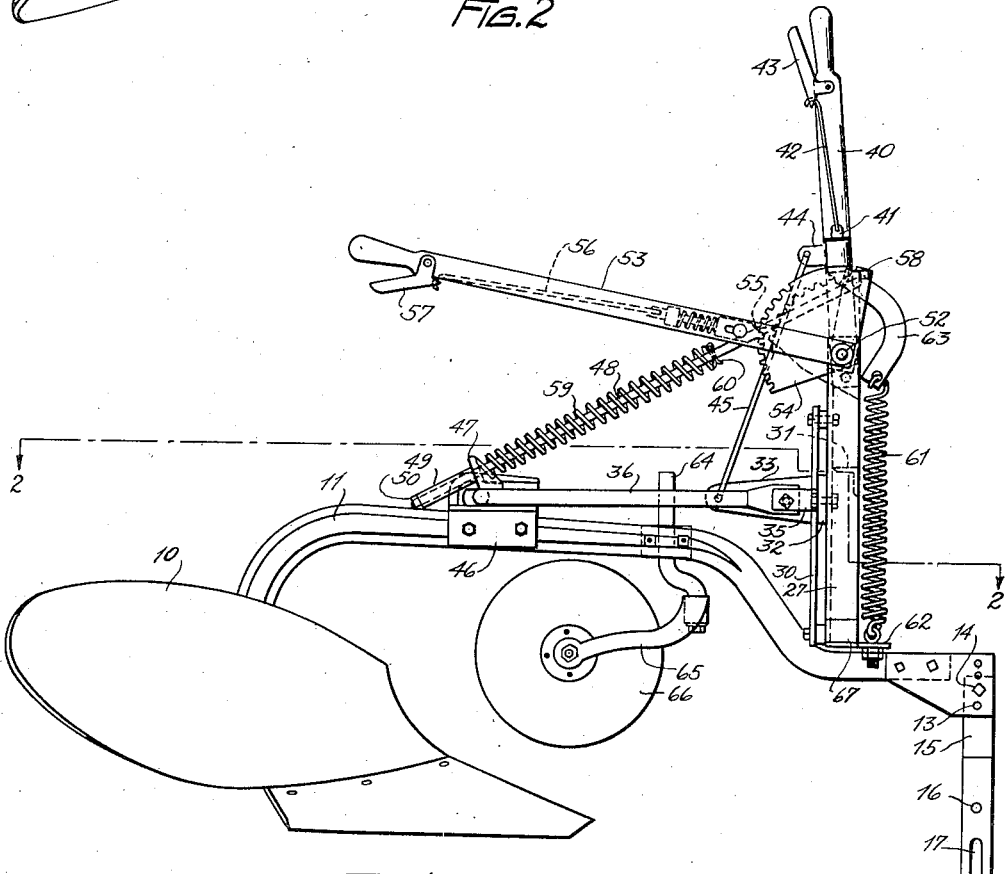
Figure 3:
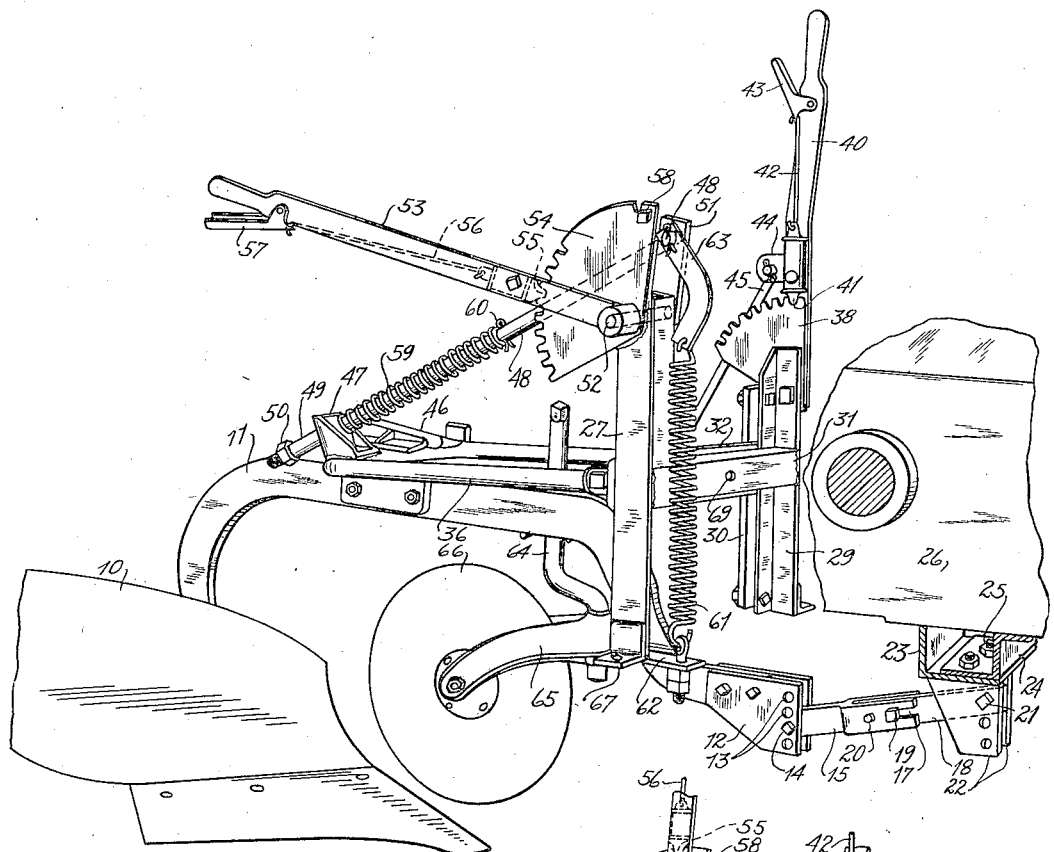
Fig. 3 is a perspective view showing a fragment of the tractor to which the plow beam is hitched, the plow being illustrated in lowered or operative position.

In the drawings the plow, shown at 10, is carried upon the rear end of a plow beam 11. At its forward end this beam is downwardly offset, as illustrated in Figs. 1 and 3, and is bolted between a pair of plates 12 which are provided with a series of vertically spaced holes 13 in order to receive adjustably a bolt 14 which serves to pivotally connect with the plates a drag link element 15 having a bifurcated forward end, the bifurcations of which are provided with aligned holes 16 and aligned slots 17. A second drag link element 18 projects into the space between the bifurcations of element 15, and is provided with a pin 19 adapted to slide in the slots 17 and with a hole for the reception of a wooden or other frangible pin 20 extended through the aligned holes 16 in the bifurcated element 15. This pin 20 is of such size and strength that it will break whenever the plow encounters a heavy rock or other object which will not yield, and might therefore cause damage to the apparatus.

The forward extremity of drag link 18 may be pivoted to a convenient part of a tractor or other vehicle, the connection in the present instance being illustrated as consisting of a bolt 21 extending through a hole in the element 18 and through aligned holes in a pair of plates 22 depending from an angle iron 23, the horizontal flange of which is attached to a transverse Z-bar 24 on the tractor by means of bolts 25. The Z-bar is attached to the under side of a casting 26 forming a part of the frame of a tractor.

I attach to the tractor in a rigid manner a vertical frame which is used to support the plow beam, permitting it to have a floating action. The plow raising and lowering means is also mounted upon this frame. The frame in question may include a side post comprising an angle bar 27 and an angle bar 28, the latter bar extending from the top of the post part way down only, these two parts being welded together. Another side post consists of an angle bar 29 and a flat bar 30 spaced from the bar 29. The bars 27 and 29 are connected about midway of their lengths by a horizontal angle bar 31, these bars being also welded together.

To the rear side of the bar 27 there is pivoted a flat transverse bar 32, the opposite end of which slides in the space between the bars 29 and 30. The extremity of this bar 32 is bent rearwardly at a right angle to form an operating arm 33. On the rear side of bar 32 there are welded or otherwise secured two sets of brackets 34 and 35, the brackets of each set being spaced apart to receive the flattened ends of a rearwardly extending bail 36, which is hinged to the brackets by aligned pivot pins or bolts 37. The bail 36 constitutes the means for supporting, raising and lowering the plow beam 11, and for tilting the plow with respect to the frame.

On the bar 29 there is secured a toothed sector 38, and at the center of the sector there is pivoted a hand lever 40. On this lever there is carried a spring actuated latch 41 which is adapted to take into the space between any two consecutive teeth on the sector 38. This latch may be withdrawn by a wire link 42 and a pivoted hand grip 43 mounted adjacent the hand hold of the lever. Lever 40 is provided with a laterally extending lug 44 in which is pivoted the bent upper end of a rod 45, the lower end of which is hooked into a hole in the outer end of arm 33. As the lever 40 is swung about its pivot the adjacent end of bar 32 is moved up or down between the bars 29 and 30, the bar 32 swinging about its pivot on the post bar 27. In this way the plane of the bail 36 is tilted more or less.

The transverse rear part of bail 36 is embraced by two brackets 46 that are bolted in opposed relation to the sides of the plow beam 11. Each of these brackets is provided with a horizontal slot open at the forward end of the bracket, within which slots the bail is received and by which it is confined and its movement limited in any direction, except in the forward direction. On the bail 36, preferably at the rear end thereof, there is welded a perforated lug 47 which slidably receives a rod 48. A short length of pipe 49 surrounds the rod at the rear end thereof and forms an abutment against the rear side of the lug 47, being held in position by nut 50 threaded onto the rod, by means of which a limited adjustment may be effected. Adjustments of greater degree may be made by substituting different lengths of pipe 49. The forward end of rod 48 is bent at a right angle and extends through a hole in the outer extremity of a crank 51 that is fixed upon one extremity of a rock shaft 52 journaled in the upper end of post 27, 28. This shaft projects through the post and carries at its opposite end a hand lever 53.

A toothed sector 54 concentric with the shaft 52 is secured to the post bar 27, and the lever 53 runs over this sector and may be held in various angular positions by means of a sliding latch 55 which is adapted to engage between adjacent teeth on the sector and may be withdrawn by a wire link 56 and a hand grip 57 pivoted to the lever near the extremity thereof. The movement of the lever 53 upward and forward is limited by a stop 58 on sector 54. A coil spring 59 surrounds rod 48 between lug 47 and a cotter pin 60 mounted in a perforation in the rod. This spring is a buffer spring, acting to take shocks which tend to lift the plow momentarily.

In order to counterbalance the load of the plow, I use a coil spring 61 which is anchored in a small plate 62 that is welded to the bottom of post bar 27 and projects forward therefrom. The upper end of this spring is so connected as to tend to produce rotation of rock shaft 52 in a clockwise direction, as viewed in Figs. 1, 3 and 4. In the present instance it is attached to the bent upper extremity of rod 48 where that rod projects through crank 51, the attachment being made through the intermediacy of a short angular link 63. It will be noted that the parts are so arranged that when the plow is in the ground, that is in operative position as illustrated in Fig. 3, the line of centers of the counterbalancing spring 61, considering the spring and link 63 together, extends close to rock shaft 52. In fact this line of centers may pass through rock shaft 52, and this is the reason for the angularity of link 63. Hence at this time the spring 61 exerts either no leverage at all on rock shaft 52 tending to raise the plow, or else a very small leverage. In other words the counterbalancing effect at this time is practically negligible and the full weight of the plow is available to hold it in operative position.

Figure 4:
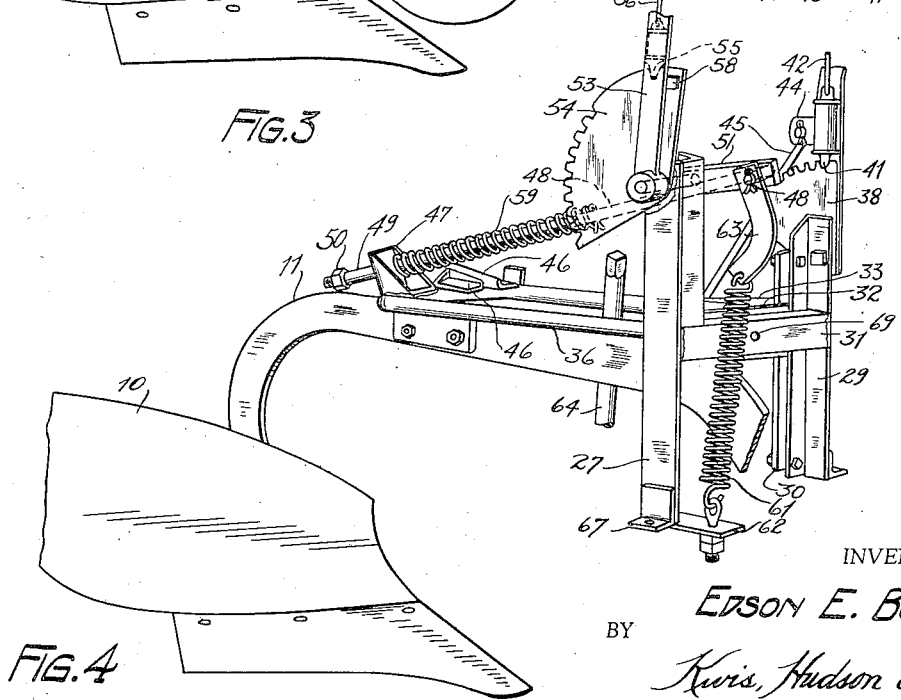
Fig. 4 is a perspective view showing the plow in elevated position.

It will be observed also that when the plow is in raised position, as illustrated in Fig. 4, the crank 51 extends almost at right angles to the spring 61, therefore affording maximum leverage. In the present case the spring 61 is anchored almost directly beneath rock shaft 52. It will be appreciated that a similar effect could be secured by anchoring the spring to a fixed element in some other radial direction from the rock shaft, provided the angular position of the crank 51 were also changed, so as to keep the same leverage conditions for inoperative and operative plow positions. However, I prefer the arrangement illustrated herein because when the plow is in raised position, as shown in Fig. 4, the crank 51 brings the rod 48 to or slightly beyond dead center position with respect to rock shaft 52, the movement in this direction being limited by stop 58. The plow is then effectively supported in the raised position without strain upon the lever latching means 55, and substantially all strain is removed from the counterbalancing spring 61.

To one side of the plow beam 11 there may be attached a post 64, upon the lower extremity of which an arm 65 is swiveled, a coulter 66 being mounted upon the latter arm.

The frame which carries bail 36 is adapted to be rigidly attached to a tractor. For this purpose post bars 27 and 29 are provided with feet consisting of outwardly extending angles 67 and 68 welded to the bars, the horizontal flanges of these angles being perforated for the reception of bolts that are anchored in the tractor. In the crosswise brace bar 31 there is also a perforation 69 which is adapted to receive a third bolt anchored in the tractor. By this means a rigid connection between the plow frame and the tractor may be made quickly and easily, and the frame may be likewise disassembled from the tractor with facility.

The method of operation of the invention, it is believed, will be clear from the above description of its parts. The tilting adjustment of the plow by means of lever 40 is used chiefly for maintaining the plow in proper vertical position when the tractor itself is tilted, due to the wheels on one side running in a furrow, while those on the other side are running on the unplowed ground. The tilting adjustment is also useful when plowing on a side hill. Sufficient looseness is provided in the drag link connections to permit the necessary tilting of the plow beam. When the operator desires to raise the plow, he grasps the end of hand lever 53, then in the position of Fig. 3, pulling up the grip 57 and releasing the latch 55. He then swings the lever to the position of Fig. 4. In the first part of this movement little or no assistance is rendered by the spring 61, but as soon as the movement is well started the spring begins to become effective and its effect increases as the leverage exerted through crank 51 increases. When the parts reach the position of Fig. 4 the weight of the plow itself acting along the line of rod 48, which is then below the rock shaft 52, serves to prevent accidental lowering of the plow. In addition the tension of spring 61 acts for the same purpose.

In the event that the plow while moving through the ground encounters some immovable obstruction, the frangible pin 21 breaks and the bar 18 then pulls out of the bifurcated portion of bar 15. The bail 36 also moves forward out of the open ends of brackets 46, and the plow is left behind.

Variations from the described structure may be employed. Accordingly I desire it to be understood that the scope of the invention is to be regarded as defined exclusively by the appended claims rather than by the foregoing description or the accompanying illustrations.

Having thus described my invention, I claim:

1. In combination, a frame, a plow, means for raising and lowering the plow comprising a rock shaft, a crank thereon, and means for operatively connecting the crank with the plow to the rear of said rock shaft, said crank standing in substantially vertical position when the plow is in the ground and in substantially horizontal position when the plow is raised, a counterbalancing spring attached to the end of the crank and to the frame at a point beneath said rock shaft, whereby the leverage exerted by the spring is approximately zero when the plow is in the ground and substantially a maximum when the rock shaft is turned forward through a quarter revolution to raise the plow.

2. In combination, a frame, a plow, means for raising and lowering the plow comprising a rock shaft and a crank thereon, a link operatively connected with the plow and having a bent end extended through an aperture in the outer end of said crank, and a counterbalancing spring connected at one end to the frame and at the other end to said bent end of the link.

3. In combination, a frame, a plow, means for raising and lowering the plow comprising a rock shaft and a crank thereon, said crank extending in a substantially vertical direction from said rock shaft when the plow is in plowing position, an operative connection between the outer end of the crank and the plow to the rear of said rock shaft, and means for turning the rock shaft to cause the crank to project forward to raise the plow and to bring the said connecting means substantially into dead center position with respect to said rock shaft.

4. In combination, a frame, a plow, means for raising and lowering the plow comprising a rock shaft and a crank thereon, said crank extending in a substantially vertical direction from said rock shaft when the plow is in plowing position, an operative connection between the outer end of the crank and the plow to the rear of said rock shaft, means for turning the rock shaft to cause the crank to project forward to raise the plow and to bring the said connecting means slightly beyond dead center with respect to said rock shaft, and yieldable means for holding the parts in the last named position.

EDSON E. BOWEN.